United States Patent [19]

Stradella et al.

[11] 4,003,548
[45] Jan. 18, 1977

[54] HIGH-PRESSURE VALVE WITH BALANCED INTERNAL COMPONENTS

[76] Inventors: Giuseppe Stradella; Umberto Stradella, both of 13, Via Roma, Genova, Italy

[22] Filed: Nov. 4, 1975

[21] Appl. No.: 628,788

[30] Foreign Application Priority Data

Nov. 15, 1974 Italy .................................. 13049/74
Mar. 26, 1975 Italy .................................. 12531/75

[52] U.S. Cl. .................................... 251/45; 251/43
[51] Int. Cl.² ........................................ F16K 31/385
[58] Field of Search ................................ 251/45, 43

[56] References Cited
UNITED STATES PATENTS 1,657,817   1/1928   Cadwell et al. .................. 251/45 X

FOREIGN PATENTS OR APPLICATIONS 632,173   12/1961   Canada .................................. 251/45

*Primary Examiner*—Arnold Rosenthal

[57] ABSTRACT

High-pressure valve provided with internal opening and closing members which are indirectly actuated by a handwheel and a servo-control system based on the balancing effect generated by the same pressure of compressed air or gas or the like to be dispensed so as to obtain a very sensitive operation, the assembly being particularly suitable for compressed air or gas bottles or the like.

6 Claims, 1 Drawing Figure

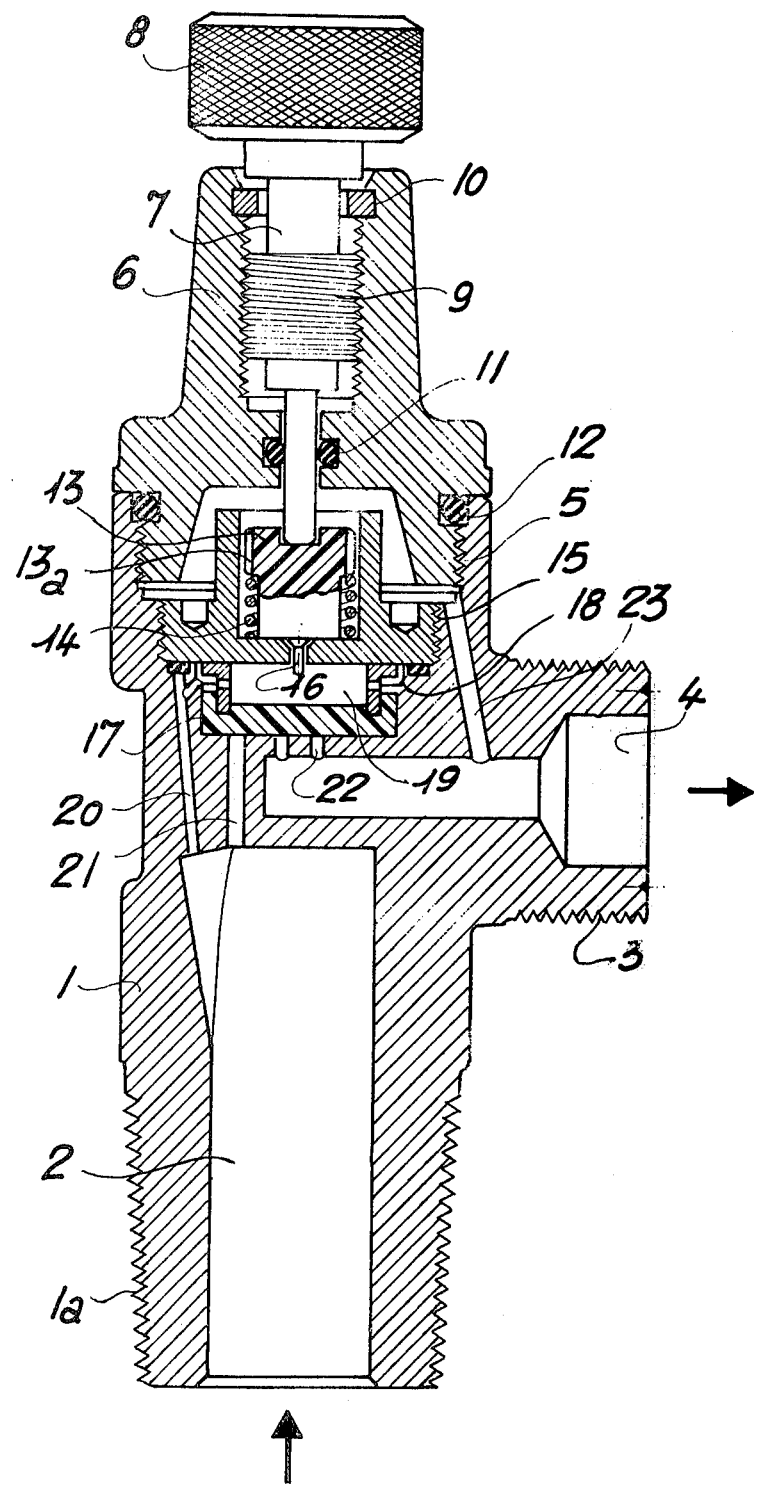

HIGH-PRESSURE VALVE WITH BALANCED INTERNAL COMPONENTS

BACKGROUND OF THE INVENTION

This invention relates to a high-pressure valve having balanced internal components that is, extremely sensitive and operable with no effort. Said valve can be advantageously used generally in the field of high-pressure devices, but it has been developed particularly for application on compressed air or gas bottles, with the main purpose to make the operation of the valve assembly more sensitive and easier to use notwithstanding the contrasting high pressures, usually reaching 200 atmospheres.

In the field of compressed gas bottles, suitable sturdy valves are used for opening and closing purposes, and are actuated by a handwheel or a suitable lever. Due to the contrasting high pressure, in order to obtain a fluid-tight closing, said valves must be tightened with great force and, particularly when the mating seats are no longer perfect, said force could be so great as to break the control stem, which occurs frequently.

SUMMARY OF THE INVENTION

As a consequence, a solution has been proposed to avoid said drawbacks, and the final result is the article proposed by this invention.

Substantially, the valve according to the invention is based upon the use of a closing and opening member which is actuated indirectly by means of a balanced servo-control system that can use the pressure of the same compressed air or gas as an actuating means for the closing operation. Therefore, the internal components of said valve are subject to a minimum of mechanical stress, and the control stem and handwheel can be of reduced size, and yet the actuation thereof will be very soft and easy even after a long period of use of said valve. Moreover, said system will permit precise modulation, and in the closing condition will grant an absolute tightness with no effort. A further advantage is the high reliability, resulting directly from the lower stress acting on the various internal components.

BRIEF DESCRIPTION OF THE DRAWING

The accompanying drawing shows, as a non limitating and exemplifying embodiment, a sectional view of a valve according to the invention, substantially designed to be used on compressed gas bottles, that is in a field where — due to the high-pressure and heavy conditions of use — the advantages of this invention are fully evidenced.

DESCRIPTION OF THE PREFERRED EMBODIMENT

As usual in said particular field, the valve of the invention comprises a body 1 designed for right-angle flow, having a lower externally-threaded extension 1a for screw-connection with the mouth of a bottle, and an inlet chamber 2. The outlet connecting portion 3, also externally threaded, extends radially from said body 1 and defines an outlet conduit 4 extending to the centre of said body. The top end portion of said body comprises a cup-shaped seat 5 which is internally threaded for screw connection with a cover member 6 mounting an axial control stem 7 having a control knob 8 which substitutes for the usual, larger-diameter, control handwheel. Said control stem, as clearly shown in the accompanying drawing, is designed for indirect operation so as to be relieved from most mechanical stress. To this purpose, said stem 7 is provided, at a central part thereof, with a larger-diameter threaded portion 9. Said portion 9 threadedly engages an internally-threaded bore of said cover member 6, said bore having near the top end thereof an annular groove for insertion of a snap-ring 10 acting as a stop against undesired excessive unscrewing movement of said stem. The lower portion of the stem, of cylindrical shape and reduced diameter, is surrounded by a sealing ring 11. The bottom end of the stem extends into a chamber formed in the lower portion of cover member 6; the latter will be screwed into said body 1 after insertion of a sealing ring 12. Said bottom end of the stem is planar and abuts axially against a valve member block 13 of suitable plastic material, such as polyamide or the like. Said block 13 can move axially and has an annular collar forming a shoulder for engagement with a coil spring 14 urging said block 13 against the lower end of stem 7, the assembly being axially movable and guided within a cylindrical cup-shaped projection from the top surface of an assembling member 15 mounted in a suitable seat which is formed in said body 1. The undersurface of said block 13 is planar except for a central conical projection 16 fitting into a mating hole centrally formed through a wall of member 15. Said conical projection serves merely to modulate, in the opening movement, the flow of compressed gas used in the servo-controlled actuation of a diaphragm valve 17 which is fitted under said member 15. The valve member block 13 is provided, around its circumference, with a number of longitudinal grooves 13a that permit the servo-control compressed gas to pass through the periphery thereof. This flow of compressed gas is completely shut off when the planar undersurface of block 13 abuts against the planar bottom of cup-shaped member 15. The actual valve member is mounted on the bottom of the upper chamber of valve body 1 and is formed by a main diaphragm 17 of flexible material having a peripheral upturned rim. In order to obtain the necessary sealing effect around the circumference of said diaphragm valve member 17 without affecting the flexibility of the central portion thereof, mounted between said cup-shaped member 15 and said diaphragm is a lock-ring 18 having two different outer diameters and a number of radial holes through the reduced-diameter portion so as to permit communication between the inner chamber and an auxiliary offset duct 20 opening into the inlet chamber 2 of the valve. A plurality of larger ducts 21 are offset on a smaller radius, between chamber 2 and the bottom on which said diaphragm 17 rests, and permit, upon opening, the desired outflow of gas or air to be dispensed. A group of ducts 22 are formed through the central part of the bottom wall supporting the diaphragm 17 and lead into the outlet conduit 4, with the purpose to convey the gas to be dispensed into said conduit 4 upon opening, that is upon lifting of diaphragm 17. The reason for the group of ducts 22 is to fractionize the area of the passage and thereby reduce the stress of diaphragm 17 by high-pressure gas, which diaphragm is granted a large supporting surface notwithstanding the great total area of the passage. The same result is also obtained by any other means in lieu of said group of ducts, and according to the invention said ducts can be replaced by a single hole having fitted therein a porous member made by a sintering process or the like. Finally, another offset duct 23 of larger diameter than said auxiliary duct 20, connects the chamber between cover 6 and member 15 to the outlet conduit 4, so as to discharge — at due time — the gas that has been used for balancing purposes. The sealing action between the valve body 1 and the cover member 6, and between the body 1 and the cup-shaped member 15 is obtained by means of O-rings or the like.

The valve according to the invention operates as follows:

It is assumed that the valve is screwed with its lower portion on a bottle containing compressed gas. In the closed position, as shown in the drawing, the valve member block 13, urged by the stem 7, closes the central hole of the cup-shaped member 15 and, therefore, the same pressure existing in the bottle establishes, through duct 20 and radial holes of lock-ring 18, under the member 15 and exerts on the exposed upper surface of main diaphragm 17 and positively pushes the same against the bottom of the chamber 19 and, therefore, against the plurality of inlet ducts 21 and group of outlet ducts 22 leading into the outlet conduit 4. Consequently, the outlet is completely shut off by the action of the gas pressure and in an indirect manner, that is with no need to force the control stem 7 proportionally to the pressure in the bottle. Practically, the assembly operates as a servo-control taking advantage of the pressure of compressed gas and the surface differential acted upon by the same.

By rotating the knob 8 in the opening direction, the stem 7 moves upwardly, and the block 13 with its projection 16, under the action of spring 14, also moves upwardly and opens the central passage of member 15. Consequently, since the auxiliary duct 20 feeding the pressure has a smaller diameter than the discharge duct 23, the pressure above diaphragm 17 decreases and said diaphragm flexes upwardly under the action of the pressure existing in the bottle and acting through ducts 21. This deflection exposes the outlet ducts 22 and the compressed gas can thus flow into the outlet conduit 4 and to the user as indicated by the arrow. As soon as, with minimum effort, the central hole of member 15 is closed by rotating the knob 8, the compressed gas cannot escape and acts as above described in connection with the closed condition and perfectly shuts off the outflow. Under this respect, it is to be noted that, as the stem 7 acts indirectly through the valve member block 13, made of plastic material having preferably a low friction coefficient, the operation of the valve by the knob 8, even in case of very high pressure in the bottle, is surprisingly easy. Moreover, due to the projection 16 and said system for closing the passage of compressed gas used to servo-control or balance the valve diaphragm 17, an extreme sensitivity is obtained, that is a very fine modulation capability in regulating the valve.

It is to be understood that changes and improvements can be made in the illustrated embodiment of the invention, and that the same can be used in any application of compressed air or gas, still within the basic principle of the invention.

We claim:

1. A high-pressure valve with balanced internal components, particularly sensitive and operable with little effort, designed for use on compressed gas bottles or the like, and comprising an elongated main body having a lower inlet for connection with the bottle and an outlet for connection with a dispensing device; a cup-shaped member in said main body portion; a chamber in said main body beneath said cup-shaped member and having a planar bottom surface, a valve diaphragm mounted in said chamber on said planar surface for movement between a normal position wherein the diaphragm lies against the planar surface and a raised position wherein the underside of the diaphragm rises above the planar surface, a lock ring between said cup-shaped member and said diaphragm and bearing against said diaphragm to hold said diaphragm in place, said lock ring having a first section of one diameter and a second section of reduced diameter, said second section having a plurality of radially extending bores therethrough communicating with said chamber, first conduit means establishing communication between said inlet and the underside of said diaphragm, second conduit means for establishing communication between said outlet and the underside of said diaphragm and third conduit means establishing communication between said inlet and said radial bores; a control stem mounted for axial rotation in said main body and terminating at least adjacent to said cup-shaped member and an auxiliary valve member carried by the bottom of the stem and axially movable in said cup-shaped member between open and closed positions; and passage means, controlled by said auxiliary valve member, for establishing communication between said chamber and said outlet when said auxiliary valve is in the open position; said diaphragm being operable, when said valve is installed in a compressed gas bottle, to remain in its normal position against said planar surface when the auxiliary valve is in the closed position and to move to its raised position when the auxiliary valve is in the open position, whereby when the diaphragm is in the raised position, gas is dispensed from the inlet to the outlet via said first and second conduit means.

2. A valve according to claim 1, characterized in that said passage means includes a bore in the bottom of said cup-shaped member below said auxiliary valve, and said auxiliary valve is of substantially cylindrical shape with an upper collar forming a shoulder, a compression spring engaging the collar and urging the auxiliary valve to the open position, said collar having a number of longitudinal grooves to permit the passage therethrough of servo-control compressed gas, said passage means includes a bore in the bottom of said cup-shaped member below said auxiliary valve and a conical projection co-operating with the bore in said cup-shaped member to modulate the passage of gas therethrough.

3. A valve according to claim 2, characterized in that said third conduit means is provided by a discharge duct of a first diameter and said passage means includes a duct means of larger diameter leading from said cup-shaped member to said outlet.

4. A valve according to claim 1, characterized in that said second conduit means is a plurality of reduced-diameter ducts in the central region of said diaphragm and close to one another.

5. A valve according to claim 1, characterized in that the control stem has an upper portion of enlarged diameter threadedly engaging said main body, said main body having an upper abutment formed by a snap ring received in a circumferential groove and acting as a stop against undesired excessive unscrewing movement of said control stem, said stem being embraced by a sealing ring at its lower portion.

6. A valve according to claim 1, characterized in that said second conduit means is a single hole having fitted therein a porous sintered member suitable for supporting said diaphragm.

* * * * *